UNITED STATES PATENT OFFICE.

NATHAN ROSEWATER, OF CLEVELAND, OHIO.

COMPOSITION OF BEVERAGES.

1,229,656.  Specification of Letters Patent.  Patented June 12, 1917.

No Drawing.  Application filed August 2, 1915.  Serial No. 43,287.

*To all whom it may concern:*

Be it known that I, NATHAN ROSEWATER, a citizen of the United States, residing at Cleveland, in the county of Cuyahoga and State of Ohio, have invented certain new and useful Improvements in the Composition of Beverages and of Concentrated Preparations for Producing Them, which beverages will closely resemble beer in composition and external appearance, taste, aroma, and flavor, as also in practically every other essential quality, excepting that of not containing alcohol and not causing the well-known detrimental intoxicating and inebriating effects of alcohol upon those who drink them, but will also contain as ingredients substances possessing essential advantageous stimulating, exhilarating, pungent, and self-preservative effects hitherto not possessed by nor contained in any beer, non-alcoholic or fermented, of which the following is a full, clear, and exact description.

The primary object of my invention is to produce an improved non-alcoholic beer and a concentrated preparation thereof with which concentrated preparation such a non-alcoholic beer can be conveniently made. This improved beer shall contain all the essential and desirable qualities as a food and drink of fermented and of non-alcoholic beer, together with stimulating, self-preservative, condimental, pungent and other qualities hitherto not possessed by any other non-alcoholic beer. I accomplish these results by adding to the non-alcoholic beer definite and limited proportions of such mildly exhilarating, non-intoxicating and stimulating bitter, tonic, xanthin substances such as caffein, thein, theobromin, etc. By adding to the same the anti-fermentive and perservative condimental constituents of spices such as mustard seed, Cayenne pepper, etc., in very minute proportions, the faintly pungent sharp taste and effect of fermented beers is closely approximated. Furthermore by adding the acetic salts of the bases, sodium, potassium, calcium and magnesium, alcoholic fermentation in such beer is largely prevented in both the concentrated and beverage forms and through the various stages of its production especially if supplemented by well known methods of cleanliness, germ exclusion and sterilization.

My object is also to produce a concentrated preparation of the beer constituents wherewith such a beer can be conveniently made and such a concentrated preparation, whether liquid or solid, can be made to represent in separate or separable units, definite proportions of the desired liquid beverage so that by mixture of such a unit or multiple of units with the proper proportion of water and of carbon dioxid forming a solution, a carbonated beer can be produced similar to the beer before its concentration, were it carbonated.

In carrying out my invention I proceed preferably to produce with any known non-alcoholic beer or non-alcoholic beer wort liquid, or concentrated non-alcoholic substance out of which it can be made, or any mixture of these, my improved non-alcoholic beverage and concentrated preparation, thereof regardless of whether such beer or beer wort liquid contains or is charged with more or less carbon dioxid, whether previously subjected to fermentation or not, provided that it does not contain any alcohol; and provided that it contains a sufficiently large percentage of the water soluble constituent of hops, and of malt or other cereals, or of starch containing grain or of dissolved starchy or saccharine substance in proper proportion to make beer therefrom.

Such beer or beer wort liquid, if not already made, is made to be of the standard extractive strength of ordinary beer, ale, etc. (6 to 8 per cent. of extractives) by any well known means. If too weak it is concentrated by means of evaporation of the contained water until it has reached the standard extractive strength; and if these beers or beer worts are above the standard they can be reduced to standard by addition of weaker beers or of water, or of water flavored with hop flavor.

While a standard strength, stronger than that named, may be preferred for some purposes and can be attained as suggested, I prefer to use the standard stated and to proceed with it as follows:

I take 100 liters of such non-alcoholic beer or wort, and of it I take one liter and macerate in it, at or near boiling temperature, for ten minutes, one gram of ground Cayenne pepper. Let stand at room temperature for about twenty-four hours and separate the liquid from the Cayenne pepper by the usual methods and dissolve in the separated liquid 5 grams caffein,
100 grams sodium acetate,
100 grams calcium acetate.

When solution is effected, then mix this solution with the balance of the 100 liters of beer, and after cooling at or near 40 F. it may be stored in containers or charged with carbon dioxid in the usual manner, and made up to the usual standard for carbonated beers if desired for beverage. During the process of preparation, storage and filling in containers, cleanliness and proper sterilization of utensils, containers, together with exclusion of germ laden air and all well known sources of contamination must be scrupulously maintained.

In the above formula there is the same aromatic bitter tonic of the hops, the same nutritive and sustaining cereal constituents of malt or other grain substances as in fermented beers; also the same carbon dioxid in solution, but alcohol is not present; nevertheless, by means of caffein and of the capsicum the missing pungent and stimulant qualities of the alcohol is closely approached.

Through the preservative and anti-fermentive action of its condimental ingredient, and of the acetic acid radicle of the acetates, when set free, the saccharine constituents of this caffeined beer are materially protected against fermentation; and such beers differ essentially from those non-alcoholic beers which are merely sterilized and which can be readily fermented.

To make a concentrated product of such non-alcoholic beer representing practically all its non-volatile and solid constituents, with loss of water, from which a similar beer can be conveniently made, as herein specified, and preferably before it has been finally charged with or has carbon dioxid dissolved in it, 100 liters of my improved beer are evaporated to 10 liters at low heat or *in vacuo*. It is placed in convenient appropriate vessels and can be used as follows:

To 1 volume of concentrated beer are added and mixed 9 volumes of aqueous carbon dioxid solution, with flavor of hops and other constituents added, if deficient, in the beer. Since it contains the preservatives and anti-ferments as described, this concentration will keep, without spoiling, in both condensed, liquid or solid form, so as to be convenient of carriage and of being dispensed or stored. The flavor of hops or of other volatilized constituents can be mixed or dissolved in the plain or carbonated water and filtered, if required, before mixing the latter with the concentrated beer, the quantity of flavor depending upon the amount of the deficiency of the flavor present.

Having thus described my invention I claim:

1. As a new composition of matter, a non-alcoholic beer beverage containing the essential carbohydrate constituents of beer wort, and a small proportion of a xanthin substance.

2. As a new composition of matter, a non-alcoholic beer beverage containing the essential carbohydrate constituents of beer wort, and a small proportion of caffein.

3. As a new composition of matter, a non-alcoholic beer beverage containing the essential carbohydrate constituents of beer wort, a small proportion of a xanthin substance, and the acetate of a base which is normally present in the human body.

4. As a new composition of matter, a non-alcoholic beer beverage containing the essential carbohydrate constituents of beer wort, a small proportion of caffein, and the acetate of a base which is normally present in the human body.

5. As a new composition of matter, a non-alcoholic beer beverage containing the essential carbohydrate constituents of beer wort, a small proportion of a xanthin substance, the acetate of a base which is normally present in the human body, and minute proportions of the extractive of a pungent condiment.

6. As a new composition of matter, a non-alcoholic beer beverage containing the essential carbohydrate constituents of beer wort, a small proportion of caffein, the acetate of a base which is normally present in the human body, and minute proportions of the extractive of a pungent condiment.

7. As a new composition of matter, a non-alcoholic beer beverage containing the essential carbohydrate constituents of beer wort, a small proportion of a xanthin substance, the acetate of a base which is normally present in the human body, and minute proportions of the condimental extractive of Cayenne pepper.

8. As a new composition of matter, a non-alcoholic beer beverage containing the essential carbohydrate constituents of beer wort, a small proportion of caffein, the acetate of a base which is normally present in the human body, and minute proportions of the condimental extractive of Cayenne pepper.

9. As a new composition of matter, a non-alcoholic beer beverage containing the essential carbohydrate constituents of beer wort, a small proportion of caffein, and the acetates of sodium and calcium and minute proportions of the condimental extractive of Cayenne pepper.

NATHAN ROSEWATER.